(12) United States Patent
Dhanapal et al.

(10) Patent No.: US 11,528,623 B2
(45) Date of Patent: Dec. 13, 2022

(54) USER DEVICE ASSISTED CONNECTED MODE MEASUREMENT ENHANCEMENTS

(71) Applicant: APPLE INC., Cupertino, CA (US)

(72) Inventors: Muthukumaran Dhanapal, Dublin, CA (US); Srirang A. Lovlekar, Cupertino, CA (US); Sethuraman Gurumoorthy, San Jose, CA (US); Vijay Venkataraman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/800,314

(22) Filed: Nov. 1, 2017

(65) Prior Publication Data

US 2019/0132755 A1    May 2, 2019

(51) Int. Cl.
| | |
|---|---|
| *H04W 24/10* | (2009.01) |
| *H04W 24/08* | (2009.01) |
| *H04W 76/10* | (2018.01) |
| *H04W 36/00* | (2009.01) |
| *H04W 88/02* | (2009.01) |

(52) U.S. Cl.
CPC ........... *H04W 24/08* (2013.01); *H04W 24/10* (2013.01); *H04W 76/10* (2018.02); *H04W 36/0083* (2013.01); *H04W 88/02* (2013.01)

(58) Field of Classification Search
CPC . H04W 24/08; H04W 36/0083; H04W 88/02; H04W 36/0058; H04W 24/10; H04W 36/083; H04W 36/0088
See application file for complete search history.

(56) References Cited

U.S. PATENT DOCUMENTS

| | | | | |
|---|---|---|---|---|
| 2007/0281693 | A1* | 12/2007 | Ballentin | H04L 27/2602 455/435.1 |
| 2014/0140247 | A1* | 5/2014 | Venkata | H04W 4/90 370/259 |
| 2015/0045025 | A1* | 2/2015 | Lim | H04W 36/20 455/434 |
| 2015/0312803 | A1* | 10/2015 | Yang | H04W 24/04 370/252 |
| 2016/0183263 | A1* | 6/2016 | Liu | H04W 24/02 370/329 |
| 2017/0325144 | A1* | 11/2017 | Raghunathan | H04W 36/16 |
| 2017/0331670 | A1* | 11/2017 | Parkvall | H04W 52/0274 |
| 2018/0213454 | A1* | 7/2018 | Santhanam | H04W 36/04 |
| 2018/0213576 | A1* | 7/2018 | Koskinen | H04W 76/34 |
| 2018/0249385 | A1* | 8/2018 | Wong | H04B 17/318 |
| 2019/0342783 | A1* | 11/2019 | Kim | H04W 24/08 |

* cited by examiner

*Primary Examiner* — Barry W Taylor
(74) *Attorney, Agent, or Firm* — Fay Kaplun & Marcin, LLP

(57) ABSTRACT

A method is disclosed where a user equipment ("UE") determines that the UE is in a connected mode. The UE then determines a connection type of the connected mode and prioritizes a measurement report based on the connection type. The method may also be performed by an integrated circuit of the UE.

19 Claims, 5 Drawing Sheets

USER DEVICE ASSISTED CONNECTED MODE MEASUREMENT ENHANCEMENTS

BACKGROUND INFORMATION

A user equipment ("UE") may be configured to establish a connection to at least one of a plurality of different networks or types of networks to perform a variety of different functionalities via the network connection. For example, the UE may communicate with another UE through the network connection. In another example, the UE may communicate with various servers to exchange data.

When the UE has established a connection with the network, the UE does not have the capability of performing connected mode measurements based on a connection type. That is, the UE cannot prioritize measurements of certain report configurations depending on the type of traffic between the UE and the network. This can cause the UE to inefficiently perform connected mode measurements, which leads to poor battery performance and mobility failures.

SUMMARY

The present application discloses a device, system and apparatus for adaptive frequency correlation estimation for channel estimation. In a first aspect, a method is disclosed where a user device ("UE") determines that the UE is in a connected mode. The method then determines a connection type of the connected mode and prioritizes a measurement report based on the connection type.

In a second aspect, a UE is disclosed. The UE may have a transceiver configured to connect to a base station of a network and a processor. The processor may be configured to determine that the UE is in a connected mode with the base station. The processor may be further configured to determine a connection type of the connected mode and prioritize a measurement report based on the connection type.

In a third aspect, an integrated circuit is disclosed. The integrated circuit may have circuitry to determine that a user equipment ("UE") is in a connected mode. The integrated circuit may further have circuitry to determine a connection type of the connected mode and to prioritize a measurement report based on the connection type.

DETAILED DESCRIPTION

Figure 1:
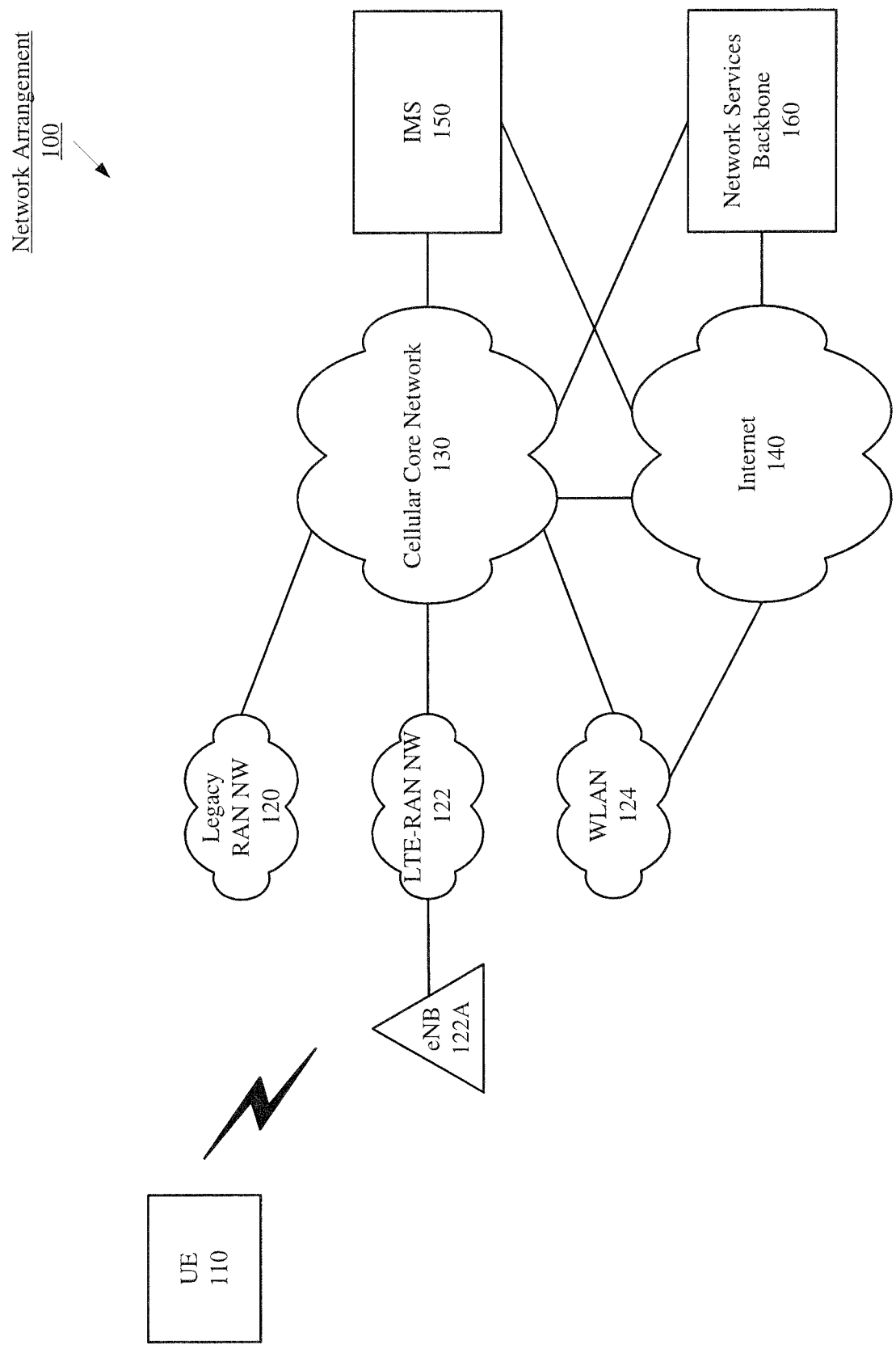
FIG. 1 shows a network arrangement according to various exemplary embodiments described herein.

The exemplary embodiments may be further understood with reference to the following description and the related appended drawings, wherein like elements are provided with the same reference numerals. The exemplary embodiments are related to a device, system, and method for prioritizing connected mode measurements based on a connection type. Specifically, as will be described in further detail below, the exemplary embodiments are related to determining the type of traffic being exchanged between a user equipment ("UE") and a network during a connected mode and, depending on the type of traffic being exchanged, prioritizing measurements of certain report configurations.

Initially, it is noted that the exemplary embodiments are described with regard to a UE. However, the use of a UE is merely for illustrative purposes. The exemplary embodiments may be utilized with any electronic component that may establish a connection with a network and configured with the hardware, software, and/or firmware to perform certain operations such as demodulation, decoding, channel estimation, etc. Therefore, the UE as described herein is used to represent any electronic component.

Further, it is noted that the exemplary embodiments are described with regard to the network being a LTE network and the base station of the network being an evolved Node B ("eNB"). However, it should be noted that the use of the LTE network and the eNB is merely for illustrative purposes. Those skilled in the art will understand that the network may be any network and the base station may be any type of base station within the corresponding network.

It should further be noted that while utilizing a broadband, packet based system for the transmission of text, digitized voice, video and multi-media, such as an UMTS Terrestrial Radio Access Network ("UTRAN"), a Radio Resource Control ("RRC") part of a protocol stack is responsible for the assignment, configuration and release of radio resources between the UE and the network. Two basic modes that the UE can operate are defined as "RRC idle mode," or simply "idle mode," and "RRC connected mode," or simply "connected mode." In idle mode, the UE may request a RRC connection from the network whenever it wants to send any user data or respond to a page for receiving data from an external data network. It should be understood by those skilled in the art that there may be other modes depending on which network the UE is camped on. For example, if the UE is camped on a GSM Edge Radio Access Network ("GERAN"), the UE may be in one of three modes: the idle mode, the connected mode or a packet transfer mode.

When the UE is in the RRC connected mode and camped on a UTRAN network, the UE can be in one of four states: Cell_DCH, where a dedicated channel is allocated to the UE in the uplink and downlink directions to exchange large amounts of data; Cell_FACH, where common channels are used, a Random Access Channel ("RACH") is used in the uplink and a Foreword Access Channel ("FACH") is used in the downlink, to exchange a small amount of data and no dedicated channel is allocated to the UE; Cell_PCH, where the UE uses Discontinuous Reception ("DRX") to monitor broadcast messages and pages through a Paging Indicator Channel ("PICH") and no uplink activity is possible; and URA_PCH, wherein a UTRAN Registration Area ("URA") update procedure is triggered through URA reselection. Those skilled in the art would understand that when the UE is camped on other networks, the UE may be in one the states associated with the other network.

In the idle mode, when the UE requests an RRC connection, the UTRAN network, for example, decides whether to move the UE to the CELL_DCH or CELL_FACH state. Conversely, when the UE is in an RRC connected mode, the network can decide when to release the RRC connection. The network may move the UE from one RRC state to another before releasing the connection or instead of releasing the connection. The state transitions are typically triggered by data activity or inactivity between the UE and the network. Since the network may not know when the UE has completed a data exchange for a given application, the network maintains the RRC connection for a pre-determined time period in anticipation of additional data exchanges with the UE.

Those skilled in the art would understand that the above discussed states (e.g., CELL_DCH, CELL_FACH, etc.) relate to an LTE network. Further, those skilled in the art would also understand that other RATs (e.g., WLAN, 5G, etc.) may have states associated with their operations that are similar to those discussed above, but are referred to under different names. As such, the exemplary embodiments discussed throughout this disclosure can be adapted to other RATs.

The exemplary embodiments may be described with regard to a connection type (e.g., RRC connection type). The connection type may relate to a type of traffic being transmitted between the UE and the network. For example, the connection type may relate to data transfer, a voice call, an emergency call, signaling, etc. Those skilled in the art would understand that the connection type may also relate to other types of transmitted traffic. The exemplary embodiments relate to a prioritizing of measurement reports (to be discussed below) based on the connection type.

FIG. 1 shows an exemplary network arrangement 100 according to the exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices (e.g., Category-M or Category M1), etc. It should also be understood that an actual network arrangement may include any number of UEs being used by any number of users. Thus, the example of a single UE 110 is merely provided for illustrative purposes.

The UE 110 may be configured to communicate directly with one or more networks. In the example, the networks with which the UE may wirelessly communicate are a legacy radio access network (RAN) 120, a LTE radio access network (LTE-RAN) 122 and a wireless local access network (WLAN) 124. However, it should be understood that the UE 110 may also communicate with other types of networks and the UE 110 may also communicate with networks over a wired connection. With regards to the exemplary embodiments, the UE 110 may establish a connection with the LTE-RAN 122. For example, the UE 110 may have a LTE chipset and communicate with the LTE-RAN 122 via the eNB 122a.

The legacy RAN 120 and the LTE-RAN 122 are portions of cellular networks that may be deployed by cellular providers (e.g., Verizon, AT&T, Sprint, T-Mobile, etc.). These networks 120 and 122 may include, for example, base stations (Node Bs, eNodeBs, HeNBs, etc.) that are configured to send and receive traffic from UEs that are equipped with the appropriate cellular chip set. The WLAN 124 may include any type of wireless local area network (WiFi, Hot Spot, IEEE 802.11x networks, etc.).

In addition to the networks 120-124, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

The exemplary embodiments relate to the UE 110 being connected to the LTE-RAN 122 via an evolved Node B (eNB) 122A. Those skilled in the art will understand that any association procedure may be performed for the UE 110 to connect to the LTE-RAN 122. For example, as discussed above, the LTE-RAN 122 may be associated with a particular cellular provider where the UE 110 and/or the user thereof has a contract and credential information (e.g., stored on a SIM card). Upon detecting the presence of the LTE-RAN 122, the UE 110 may transmit the corresponding credential information to associate with the LTE-RAN 122.

The eNB 122A may be configured to exchange data with the UE 110 through scheduled data transmissions defined using control information. For example, the eNB 122A may transmit scheduling information for data exchanges via a physical downlink control channel (PDCCH) and the data corresponding to the scheduling information via a physical downlink shared channel (PDSCH). The eNB 122A may also exchange the data that is scheduled in the control information.

Figure 2:
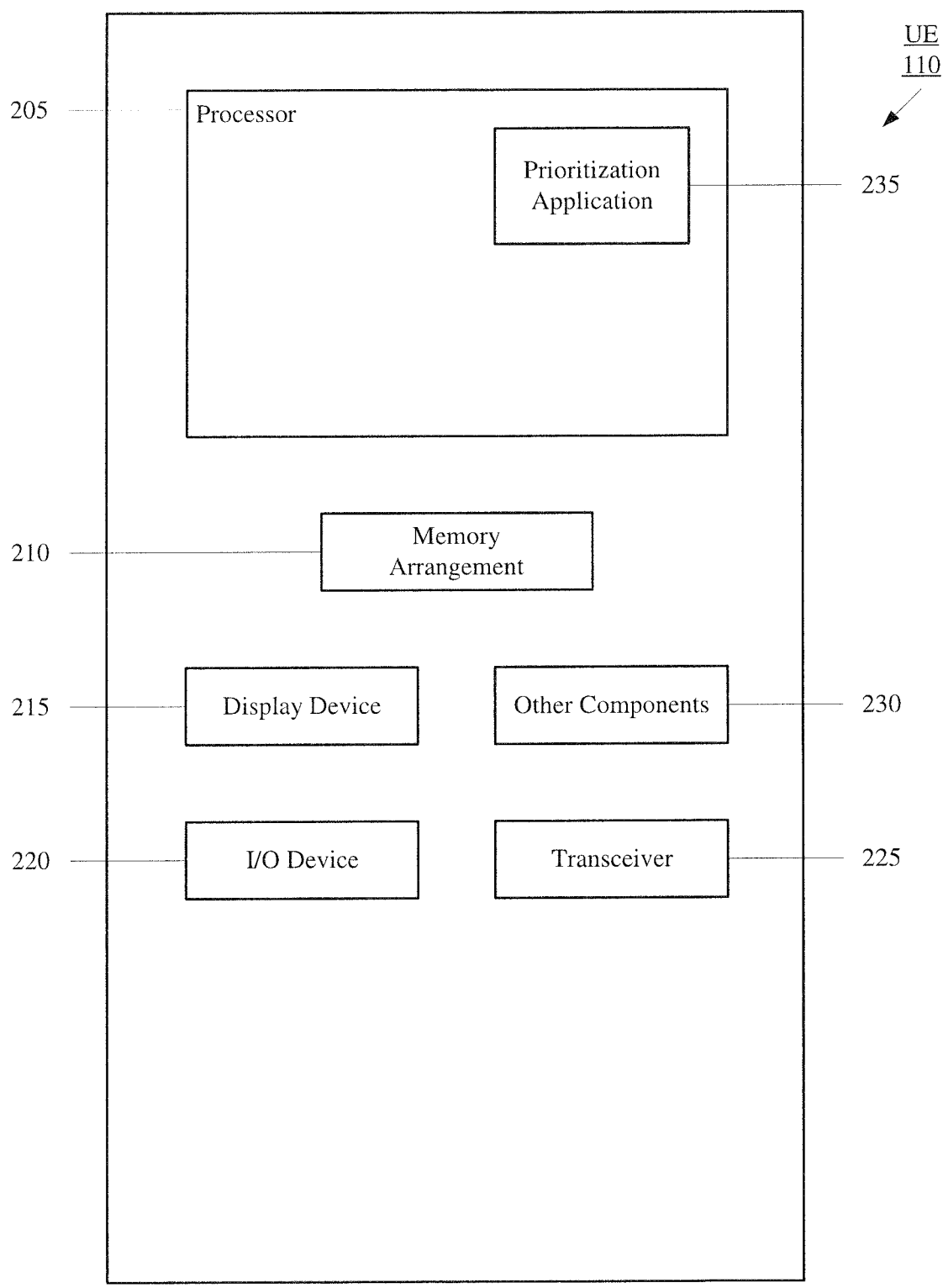
FIG. 2 shows a user equipment according to various exemplary embodiments described herein.

FIG. 2 shows an exemplary UE 110 according to various exemplary embodiments. The UE 110 may be any electronic component that is configured to connect to a network and perform wireless functionalities. For example, the UE 110 may be a portable device such as a phone, a smartphone, a tablet, a phablet, a laptop, a wearable computing device, an Internet of Things (IoT) device (e.g., Category-M or Category M1), Machine-Type Communication (MTC) devices, enhanced MTC (eMTC) devices, etc. In another example, the UE 110 may be a stationary device such as a desktop terminal. The UE 110 may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, etc.

The processor 205 may be configured to execute a plurality of applications of the UE 110. For example, the applications may include a prioritization application 235. The prioritization application 235 may be configured to prioritize report configuration types. Those skilled in the art will understand how the prioritizing may be determined using any suitable calculation or algorithm.

It should be noted that the prioritization application 235 being an application (e.g., a program) executed by the processor 205 is only exemplary. The functionality associated with the applications may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. In addition, in some UEs, the functionality described for the processor 205 is split among two processors, a baseband processor and an applications processor. The exemplary embodiments may be implemented in any of these or other configurations of a UE. For illustrative purposes, the processor 205 may be a baseband processor.

The memory 210 may be a hardware component configured to store data related to operations performed by the UE 110. As will be described in further detail below, the memory 210 may store data that corresponds to the number of subframes that may be needed to successfully perform certain operations (e.g. channel estimation, demodulation, decoding, etc.) based on a variety of factors. However, the use of the memory 210 is only exemplary and the UE 110 may store this data within another component or module within the UE 110 or in a component that is external to the UE 110.

The transceiver 225 may be a hardware component configured to exchange data with the eNB 122A. For example, the transceiver 225 may be configured to receive DMRS or CRS tones that are broadcast by the eNB 122A within the overall bandwidth of the LTE-RAN 122. The transceiver 225 may enable communication with the LTE-RAN 122 or with other electronic devices directly or indirectly through the LTE-RAN 122 to which the UE 110 is connected. The transceiver 225 may operate on a variety of different frequencies or channels (e.g., set of consecutive frequencies). Thus, an antenna (not shown) coupled with the transceiver 225 enables the transceiver 225 to operate on the LTE frequency band.

Handover Operation

Within the context of the exemplary cellular network of FIG. 2, a handover describes the transfer of a UE connection from one base station to another base station. Efficient handover operation enables the UE 110 to freely move from base station to base station, without a loss in coverage. Several types of handover operations are common, such as, for example, an inter-frequency handover, an intra-frequency handover, and an inter-Radio Access Technology (inter-RAT) handover.

Inter-frequency/intra-frequency handovers describe a handover from a first base station to a second base station of the same Radio Access Technology (RAT). The primary distinction between inter-frequency and intra-frequency handover is the frequency of interest. Specifically, in intra-frequency handover, the operating frequency remains the same throughout the handover whereas for inter-frequency handover the operating frequency changes. It should be noted that inter-frequency/intra-frequency handovers can be performed between different Radio Access Networks of the same RAT operated by different cellular providers.

Inter-RAT handovers describe a handover from a base station of the first RAT to a base station of the second RAT. Unlike intra-frequency handovers, the UE 110 must switch to a different RAT (e.g., change modem operation) to complete the handover. Common examples of LTE inter-RAT operation include, without limitation: UMTS Terrestrial Radio Access (inter-RAT UTRA), Global Standards for Mobile Communications (GSM)/Enhanced Data Rates for GSM Evolution (EDGE) (inter-RAT GERAN), Code Division Multiple Access (CDMA) 2000 (inter-RAT CDMA 2000).

To support inter-frequency, intra-frequency, and inter-RAT type handovers, the UE 110 provides measurement report data according to specific trigger events. For example, if the reception quality of a first base station drops, while the reception quality of a second base station increases, the UE 110 will report the change in quality to its serving network. The serving network can issue a handover command, which causes the UE 110 to perform the handover. Generally, the specific trigger events are dictated by the cellular providers and provided in messaging to the UE 110. Thus, with respect to the exemplary embodiments, the measurement reports are generally used for the purposes of handovers. However, it is possible that the measurement reports may be used for other purposes and therefore, the exemplary embodiments are not limited to handovers.

For LTE networks, the various trigger event conditions for reporting measurement reports are specified under the 3rd Generation Partnership Project (3GPP) Technical Specification (TS) Group Radio Access Network Evolved Universal Terrestrial Radio Access (E-UTRA) Radio Resource Control (RRC) Protocol specification (3GPP TS 36.331, incorporated by reference in its entirety). These measurement reports are listed in TABLE 1.

TABLE 1

| | | |
|---|---|---|
| EVENT A1 | 5.5.4.2 | SERVING BECOMES BETTER THAN THRESHOLD |
| EVENT A2 | 5.5.4.3 | SERVING BECOMES WORSE THAN THRESHOLD |
| EVENT A3 | 5.5.4.4 | NEIGHBOUR BECOMES OFFSET BETTER THAN PCELL |
| EVENT A4 | 5.5.4.5 | NEIGHBOUR BECOMES BETTER THAN THRESHOLD |
| EVENT A5 | 5.5.4.6 | PCELL BECOMES WORSE THAN THRESHOLD1 AND NEIGHBOUR BECOMES BETTER THAN THRESHOLD2 |
| EVENT A6 | 5.5.4.6a | NEIGHBOUR BECOMES OFFSET BETTER THAN SCELL |
| EVENT B1 | 5.5.4.7 | INTER RAT NEIGHBOUR BECOMES BETTER THAN THRESHOLD |
| EVENT B2 | 5.5.4.8 | PCELL BECOMES WORSE THAN THRESHOLD1 AND INTER RAT NEIGHBOUR BECOMES BETTER THAN THRESHOLD2 |
| EVENT C1 | 5.5.4.9 | CSI-RS RESOURCE BECOMES BETTER THAN THRESHOLD |
| EVENT C2 | 5.5.4.10 | CSI-RS RESOURCES BECOMES OFFSET BETTER THAN REFERENCE CSI-RS RESOURCE |
| EVENT W1 | 5.5.4.11 | WLAN BECOMES BETTER THAN THRESHOLD |
| EVENT W2 | 5.5.4.12 | ALL WLAN INSIDE WLAN MOBILITY SET BECOMES WORES THAN THRESHOLD1 AND WLAN OUTSIDE WLAN MOBILITY SET BECOMES BETTER THAN THRESHOLD2 |
| EVENT W3 | 5.5.4.13 | ALL WLAN INSIDE WLAN MOBILITY SET BECOMES WORSE THAN A THRESHOLD |
| EVENT V1 | 5.5.4.14 | THE CHANNEL BUSY RATIO IS ABOVE A THRESHOLD |
| EVENT V2 | 5.5.4.15 | THE CHANNEL BUSY RATIO IS BELOW A THRESHOLD |

As shown in TABLE 1, the measurement reports A1, A2, A3, A4, A5, and A6 facilitate inter-frequency and intra-frequency handovers. In contrast, measurement reports B1, and B2 facilitate Inter-Radio Access Technology (Inter-RAT) handovers. Further, measurement reports C1 and C2 pertain to CSI-RS resources, W1, W2 and W3 pertain to the wireless local area network, and V1 and V2 pertain to a channel of a network.

Carrier Aggregation

The UE 110 may be carrier aggregation (CA) enabled. The CA capability may include a primary serving cell (PCell) serving a primary component carrier (PCC) to the UE 110 and at least one secondary serving cell (SCell) serving a secondary component carrier (SCC) to the UE 110. Specifically, the UE 110 may associate with a network component (e.g., eNB 122A) which serves as the PCell. The PCell may control the manner in which data is exchanged with the UE 110 such as determining when uplink and downlink grants are given for the UE 110. The PCell may also control the mechanism used in exchanging data, particularly how data is transmitted to and received by the UE 110. When the UE 110 is CA capable, CA functionality enables the PCell and a further SCell to combine bandwidths to exchange data with the UE 110. The SCell may also be configured and activated by the base station based on throughput requirements. Thus, with CA, the PCell may provide a first portion of a total bandwidth for data to be exchanged while the SCell may provide a second portion of the total bandwidth. A PCell and a single SCell may be termed a double CA combination (two carriers) and may be utilized to provide the total available bandwidth. To further increase the total available bandwidth for data to be exchanged with the UE, an additional SCell may be incorporated. A PCell and two SCells may be termed a triple CA combination and may be utilized to provide the total available bandwidth. A PCell and three SCells may be termed a quadruple CA combination and may also be utilized to provide the total available bandwidth.

Using the CA functionality, the eNB 122A may serve as the PCell and any or all of the SCells. Alternatively, the eNB 122A may serve as the PCell while one or more further eNBs (not shown) may serve as the one or more SCells. For example, in a triple CA combination, the eNB 122A may serve as the PCell and a first SCell and a further eNB may serve as a second SCell.

Figure 3:
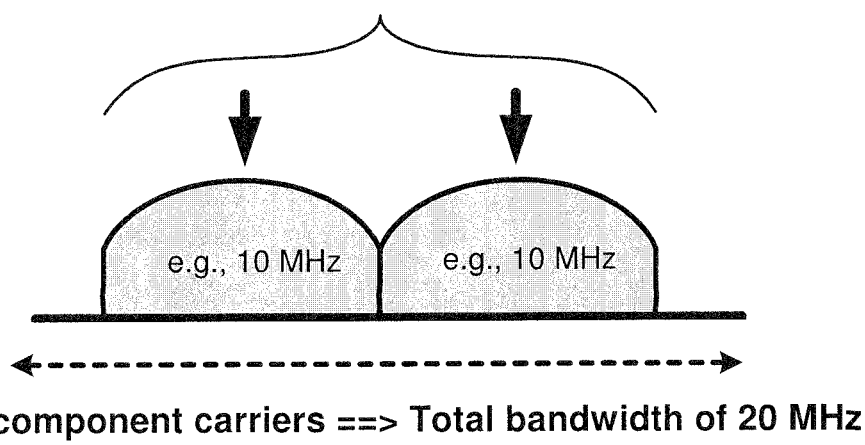
FIG. 3 shows an example of carrier aggregation according to various exemplary embodiments described herein.

FIG. 3 shows an example of carrier aggregation. As shown in FIG. 3, the PCell may provide a first component carrier of 10 MHz representing a primary component carrier (PCC) operating on a first LTE band while the SCell may provide a second component carrier of 10 MHz representing the secondary component carrier (SCC) operating on a second LTE band. Also shown in FIG. 3 is one type of carrier aggregation.

Specifically, FIG. 3 shows the two component carriers in an intra-band carrier aggregation with continuous component carriers. However, those skilled in the art will understand that other types of carrier aggregation may also be used such as intra-band carrier aggregation with non-continuous component carriers, inter-band carrier aggregation, or any combination of these three types. Furthermore, those skilled in the art will understand that other bandwidths may be used such as 1.4, 3, 5, 15, or 20 MHz and typically a maximum of five component carriers may be aggregated. Again, when only one SCell is utilized, a double CA combination arrangement may be used whereas when two SCells are utilized, a triple CA combination arrangement may be used. As illustrated in FIG. 3, two component carriers each having a bandwidth of 10 MHz may be combined for a total bandwidth of 20 MHz.

As discussed above, the operating states of the UE 110 when it is camped on a cell of a network may be characterized as RRC idle state and RRC connected state. Those skilled in the art will understand that when the UE 110 is in a RRC connected state, the UE 110 may be exchanging data with the associated network. For example, if the UE 110 is associated with the LTE-RAN 122 and in the RRC connected state, the UE 110 may exchange data associated with the connection that the UE 110 has established with the LTE-RAN 122 via a cell (e.g., the eNB 122A) and thus the UE 110 is able to perform an operation that includes the exchange of data with the LTE-RAN 122 such as a communication functionality (e.g. receive calls). Further, those skilled in the art will understand that when the UE 110 is associated with the LTE-RAN 122 and in RRC idle state the UE 110 is operating in a low power state where the UE 110 is not exchanging data with the network and radio resources are not being assigned to the UE 110 within the network. However, when the UE 110 is operating in RRC idle state the UE 110 may listen to control channel broadcasts.

Methods

Figure 4:
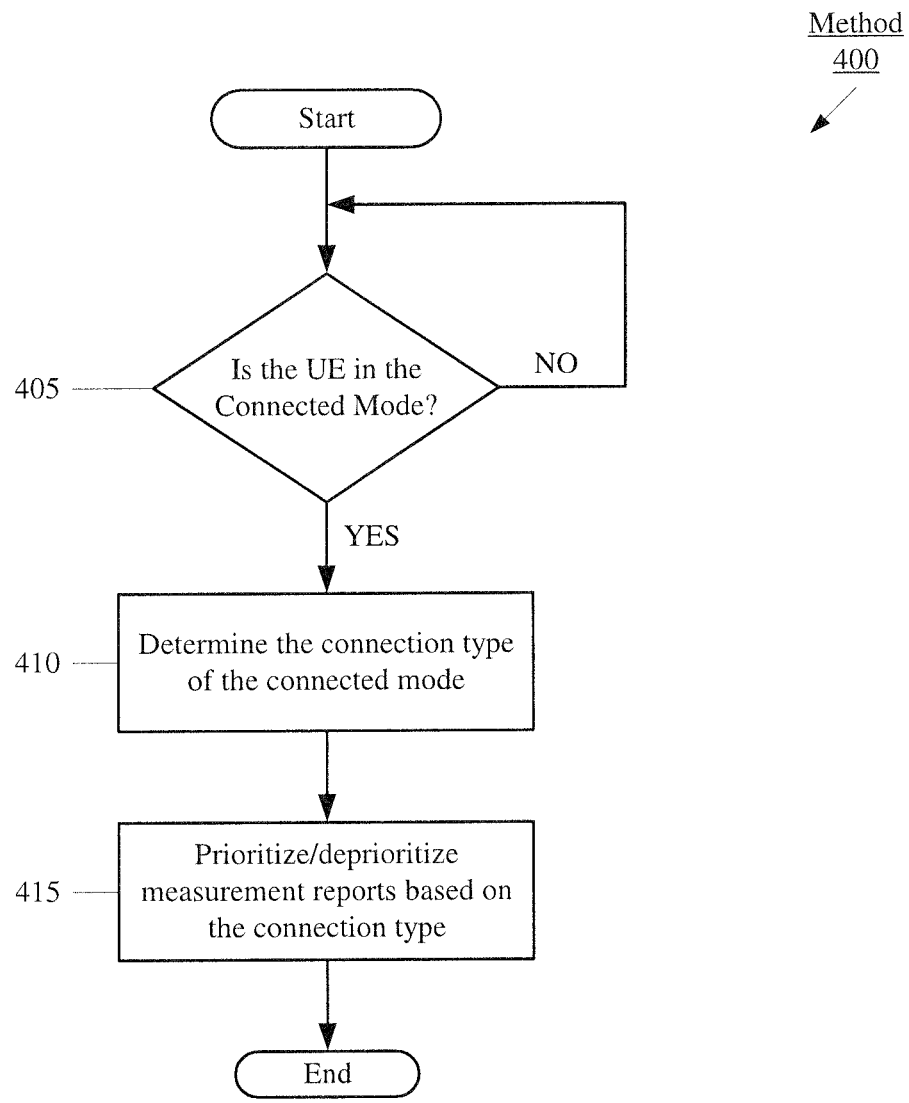
FIG. 4 shows a method of prioritizing connected mode measurements based on a connection type according to various exemplary embodiments described herein.

FIG. 4 shows a method 400 for prioritizing connected mode measurements based on a connection type according to various embodiments described herein. Specifically, method 400 relates to a method of determining the type of traffic being exchanged between the UE 110 and the network when the UE is in the connected mode and, based on the traffic type, prioritizing or deprioritizing measurements of certain report configurations, hereafter referred to as measurement configuration types. In an exemplary embodiment, the measurement configuration types may include the measurement reports discussed in TABLE 1. In a further exemplary embodiment, the measurement configuration types may include other types of configurations, which will be discussed in further detail below.

In 405, the UE 110 may determine whether the UE 110 is in a connected mode. As discussed above, the connected mode may be an RRC connected mode. However, those skilled in the art would understand that the connected mode is not limited to the RRC connected mode and may be any type of connected mode. If it is determined that the UE 110 is not in the connected mode (e.g., the UE 110 is in the idle mode), the UE 110 may loop 405 until it is determined that the UE 110 is in the connected mode. If it is determined that the UE 110 is in the connected mode, method 400 may proceed to 410.

In 410, the UE 110 may determine the connection type of the connected mode. Again, as discussed above, the connection type may relate to the type of traffic being transmitted between the UE 110 and the network. In an exemplary embodiment, the connection type may relate to one of data transfer, a voice call, an emergency call or signaling. However, it should be understood that there may be other connection types or even subtypes of connections within a connection type.

In 415, the UE 110, via the prioritization application 235, may prioritize or deprioritize certain report configuration types based on the connection type. In an exemplary embodiment, the prioritized report configuration types may be placed in a normal performance group. The remaining report configuration types may then be prioritized after the prioritized report configuration types. For example, the remaining report configuration types may be placed in the normal performance group based on their priority and the amount of available bandwidth in the normal performance group after the prioritized report configuration types been placed. Any remaining report configuration types that do not fit into the normal performance group may be placed in a reduced performance group. In an alternative exemplary embodiment, all of the remaining report configuration types may be placed in the reduced performance group regardless of any remaining bandwidth in the normal performance group.

The performance groups may be assigned to specific serving cells. For example, the normal performance group may be assigned to the PCell while the reduced performance group may be assigned to at least one of the SCells. Those skilled in the art would understand that the bandwidth within a performance group may be tied to the bandwidth of the serving cell. For example, if the PCell provides a first component carrier of 10 MHz, then the performance group assigned to the PCell may limit the amount of report configuration types that may be placed into that group based on the available 10 MHz.

Furthermore, it should be understood that the available space within a performance group may also relate to a throughput of the communication channel between the UE 110 and the cell or component carrier to which the performance group is assigned. Thus, for example, if two report configuration types are prioritized due to the connection type, and the throughput of the communication channel allows for three report configuration types to be reported, then a third report configuration type may be placed into the normal performance group (along with the two prioritized report configuration types) while the remaining report configuration types may be placed in the reduced performance group. Those skilled in the art would understand the different factors may determine which additional report configuration type is placed into the normal performance group, such as, a predefined priority, an alphabetic/numeric priority, type of measurements performed by the report configuration type, etc.)

Those skilled in the art would understand that any performance group may be assigned to any serving cell. Furthermore, it should be understood that a performance group may be split between one or more serving cells based on the available bandwidth of the serving cells.

Further, those skilled in the art would understand that the normal performance group and the reduced performance group may relate to a rate of measurements being performed of the report configuration types (e.g., the periodicity of measurement configuration). For example, if measurement report A1 is placed in the normal performance group, the measurements associated with A1 may be performed at a predetermined time interval that is associated with the normal performance group. In the same example, if measurement report A2 is placed in the reduced performance group, the measurements associated with A2 may be performed at a predetermined time interval that is associated with the reduced performance group, which would be less frequent than the rate of measurements being performed for the normal performance group.

As a further example, if the network has a configured idle discontinuous reception ("DRX") of t=1.28 second, then the normal performance group may be measured once every idle DRX (e.g., a periodicity of t seconds), while the reduced performance group may be measured once every 2t (e.g., 2.56 seconds). Those skilled in the art would understand that the above is only exemplary and that the normal performance group and the reduced performance group may be any factor of the DRX periodicity or, alternatively, the normal performance group and the reduced performance group may be linked to a parameter other than the DRX.

It should further be understood that the use of two performance groups (e.g., normal and reduced) is also only exemplary. Those skilled in the art would understand that any number of performance groups may be used and performance groups may be associated with any number for different factors. For example, three performance groups may be used, the normal performance group, the reduced performance group, and a high performance group. In such an embodiment, the normal performance group may have a periodicity of t, the reduced performance group may have a periodicity of 2.5t and the high performance group may have a periodicity of 0.5t. Additionally, it should be noted that the names of the groups do not limit their periodicity. For example, in an embodiment containing the normal performance group and the reduced performance group, the normal performance group may have a normal periodicity or a higher than normal periodicity while the reduced group may have a reduced periodicity or a normal periodicity.

Figure 5:
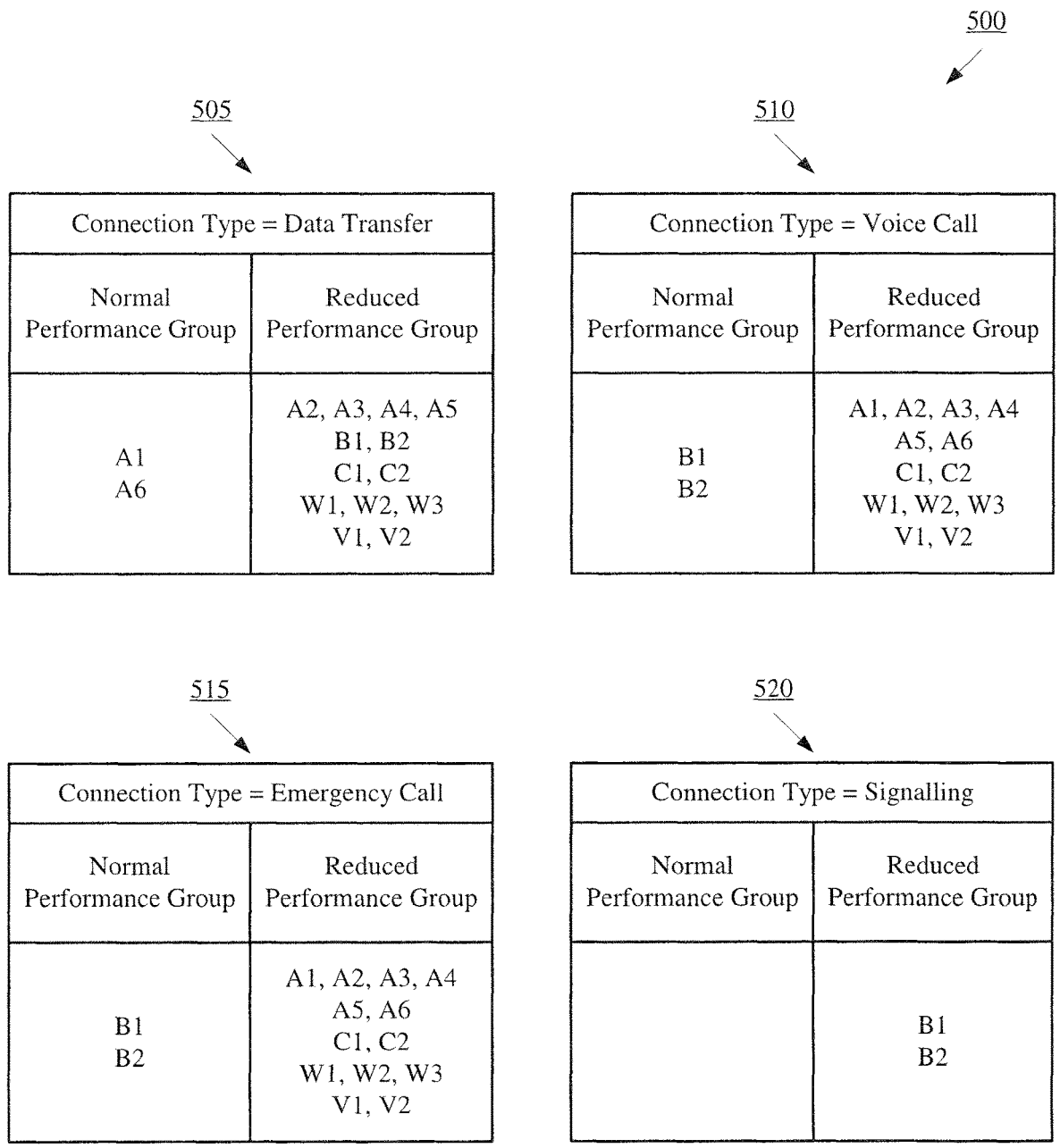
FIG. 5 shows examples of prioritizing report configuration types for certain connection types according to various exemplary embodiments described herein.

The following exemplary embodiments, which are illustrated in FIG. 5, will show examples of prioritizing report configuration types for certain connection types. Those skilled in the art would understand that the prioritized report configuration types being associated with the connection types are only exemplary, and that any of the report connection types may be prioritized or deprioritized for any of the connection types.

In a first exemplary embodiment, as seen in 505, the UE 110 may determine that the connection type relates to data transfer. The prioritization application 235 may then, for example, prioritize report configuration types for measurement reports A1 and A6. Those skilled in the art would understand that prioritizing these report configuration types for the data transfer connection type may aid in the UE 110 facilitating the network to add a secondary component carrier to reduce a data load on the primary component carrier. As such, measurement reports A1 and A6 may be placed in the normal performance group. In a first example, as seen in 505, after measurement reports A1 and A6 are placed in the normal performance group, the remaining measurement reports (e.g., A2, A3, A4, A5, B1, B2 C1, C2, W1, W2, W3, V1 and V2) may all be placed into the reduced performance group, regardless of remaining bandwidth in the normal performance group. In a second example, any remaining measurement reports (e.g., A2, A3, A4, A5, B1, B2 C1, C2, W1, W2, W3, V1 and V2) may be placed in the normal performance group based on the priority of the remaining measurement reports and the available bandwidth in the normal performance group. The remaining measurement reports that are not placed into the normal performance group may be placed into the reduced performance group. It should be understood by those skilled in the art that not all of the measurement reports discussed above may be used by a network. As such, when certain measurement reports are not used by a network, they may be excluded from the exemplary embodiments discussed in this disclosure.

It should be understood that, in this example, while the remaining measurement reports A2, A3, A4, A5, B1, B2 C1, C2, W1, W2, W3, V1 and V2 have a lower priority than the measurement reports A1 and A6 for these connection types, these remaining measurement reports may have priority with respect to each other for the purposes of including a measurement report in the normal performance group if there is available bandwidth. This priority may relate to the current connection type or may relate to a general priority. For example, with respect to a current connection type, it may be that for the data transfer connection type, measurement report A2 should have priority over measurement report A3. Thus, in the current example, if there is remaining bandwidth in the normal performance group, measurement report A2 would have priority over measurement report A3. In a further example with respect to general priority, it may be that measurement report A2 should have priority over measurement report A3 whenever these measurement reports are not prioritized for a particular connection type. It is noted that the above is only exemplary and used to illustrate the priority associated with the remaining measurement reports (e.g., those that are not prioritized for the connection type).

Thus, in the example shown in 505, the UE 110 may perform the measurements associated with measurement reports A1 and A6 at a first performance rate (e.g., normal performance rate) and send these measurement reports to the network via the PCC served by the primary cell. The UE 110 may perform the measurements associated with the measurement reports A2, A3, A4, A5, B1, B2 C1, C2, W1, W2, W3, V1 and V2 at a second performance rate that is lower than the first performance rate (e.g., reduced performance rate) and send these measurement reports to the network via one or more of the SCCs served by one or more secondary cells. It should be noted that it is not required that the prioritized measurement reports (e.g., normal performance group) are sent via the PCC and the non-prioritized measurement reports (e.g., reduced performance group) are sent via the one or more SCCs.

In another example where the connection type relates to data transfer, the prioritization application 235 may prioritize a report configuration type related to Gap measurements, such as an Autonomous Gap Cell Global Identifier ("CGI"). Prioritizing the CGI report configuration type may allow for the network to initiate a handover to a small cell to allow better data transfer characteristics for the UE 110. It should be noted that the CGI measurements may be a short measurement. As such, in a further example, the CGI report configuration type may be prioritized until the measurements are completed and a report relating to the measurements are transmitted by the UE 110. Once completed/transmitted, the CGI report configuration type may then be deprioritized. In another example, another report configuration type may then be prioritized after the CGI measurement report type is deprioritized or the CGI report configuration type may be re-prioritized after a predetermined amount of time. Although the Autonomous Gap CGI is used as an exemplary embodiment, those skilled in the art would understand that other GAP report configuration types can be prioritized or deprioritized in 415.

In a second exemplary embodiment, as seen in 510, the UE 110 may determine that the connection type relates to a voice call. In this exemplary embodiment, measurement reports B1 and B2 may be prioritized so that the UE 110 facilitates the network to perform a L2X mobility procedure to continue the voice call. The prioritization application 235 may then, for example, prioritize report configuration types for measurement reports B1 and B2. As such, measurement reports B1 and B2 may be placed in the normal performance group. Again, the remaining measurement reports may be split between the normal performance group, based on priority and available bandwidth, and the reduced performance group, or all of the remaining measurement reports may be placed into the reduced performance group as shown in 510.

In another example where the connection type relates to a voice over LTE ("VoLTE") call, the prioritization application 235 may prioritize taking measurements relating to signals received from neighbor LTE cells that have previously indicated support for VoLTE. In an exemplary embodiment, the UE 110 may maintain a list of previously used LTE cells, which may be stored in the memory arrangement 210. By prioritizing (e.g., the taking of measurements relating to neighbor LTE cells that indicated support for VoLTE), the UE 110 may experience better voice call continuity.

To illustrate, the UE 110 may be associated with a first VoLTE capable cell and may be currently performing a VoLTE call. A second LTE cell, a third LTE cell and a fourth LTE cell may be within range of the UE 110. The UE 110 may maintain a list indicating that the second and third cells support VoLTE while the fourth cell does not support VoLTE. As such, the UE 110 may prioritize taking measurements for the second and third cells because they are VoLTE capable and will support call continuity if a handover is required. Taking measurements of the fourth non-VoLTE capable cell may be de-prioritized.

In a third exemplary embodiment, as seen in 515, the UE 110 may determine that the connection type relates to an emergency call. The prioritization application 235 may then, for example, prioritize report configuration types for measurement reports B1 and B2. As such, measurement reports B1 and B2 may be placed in the normal performance group. Similar to when the connection type relates to the voice call, measurement reports B1 and B2 may be prioritized so that the UE 110 facilitates the network to perform a L2X mobility procedure to continue the emergency call.

In another example where the connection type relates to the emergency call, the prioritization application 235 may prioritize taking measurements relating to neighbor LTE cells that indicated support for an emergency call setup in the past (e.g., support IMS-emergency-setup). Similar to when the connection type relates to a voice call, the UE 110 may maintain a list of these neighbor LTE cells in the memory arrangement 210. In an exemplary embodiment, if the UE 110 receives an information block (e.g., Master Information Block ("MIB"), System Information Block ("SIB"), etc.) from a cell not on the list of previously used neighbor cells, that cell may be placed in the reduced performance group until the UE 110 decodes the information block (such as during a discontinuous reception ("DRX") Off duration) from that cell. After the information block is decoded, the cell may be placed in the normal performance group if the cell supports the emergency call setup. In one example, the emergency call setup information is related to a call setup performed in conjunction with the IMS 150.

In a fourth exemplary embodiment, as seen in 520, the UE 110 may determine that the connection type relates to signaling. The prioritization application 235 may then, for example, deprioritize report configuration types for measurement reports B1 and B2. As such, measurement reports B1 and B2 may be placed in the reduced performance group. In this exemplary embodiment, the measurement reports B1 and B2 may be deprioritized due to the short nature of a signaling connection. In a further exemplary embodiment, the report configuration types may be deprioritized under a certain condition(s). For example, the UE 110 may determine whether a criteria is satisfied and, when the criteria is satisfied, deprioritize one or more report configuration types. The criteria may be, for example, be related to cell selection procedures (e.g., Squal, Srxlev, etc.)

In another exemplary embodiment, report configuration types may be prioritized based on a connection sub-type of the connection type. For example, the UE 110 may determine that the connection type relates to data transfer. The UE 110 may then determine the type of data transfer connection that is being utilized between the UE 110 and a base station. In this example, the connection sub-type related to the data transfer connection type may be long data transfer or short data transfer. As such, the UE 110, may determine that the connection sub-type is a long data transfer and the prioritization application 235 may then, for example, prioritize report configuration types for measurement reports related to the long data transfer connection sub-type. Alternatively, if the UE 110 determines that the connection sub-type is a short data transfer, the prioritization application 235 may then prioritize report configuration types for measurement reports related to the short data transfer connection sub-type, which may be the same or different than the report configuration types related to the long data transfer sub-type. Those skilled in the art would understand that different connection sub-types may have the same or different report configuration types as their parent connection type or other connection sub-types.

Those skilled in the art would understand that the above-described exemplary embodiments may increase the battery life of the UE 110. This may be because, for example, measurements for certain report configuration types are performed less frequently when these report configuration types are placed in the reduced performance group and, thus, there is less drain on the battery. Further, the mobility performance of the UE 110 may be enhanced while the UE 110 is in the connected mode. This may be because, for example, the prioritization of certain report configuration types may allow for a smoother or quicker handover.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method, comprising:
   at a user equipment ("UE"),
   determining that the UE is in a connected mode;
   determining a connection type of the connected mode wherein the connection type is determined based on a type of traffic being exchanged between the UE and a network during the connected mode;
   prioritizing a measurement report type based on the type of traffic being exchanged on the connection type, wherein prioritizing the measurement report type includes selecting one of a plurality of predetermined measurement rates that is to be applied to a performance of a measurement associated with the measurement report type, wherein the prioritized measurement report type is added to a measurement group;
   determining a size of the prioritized measurement report type and a throughput of the connection type;
   adding another measurement report type to the measurement group based on the size of the prioritized measurement report type and the throughput of the connection type; and
   deprioritizing one or more measurement report types based on the connection type, wherein each of the one or more deprioritized measurement report types has a priority with respect to any of the other one or more deprioritized measurement report types.

2. The method of claim 1, wherein the connection type is one of a data transfer, a voice call, an emergency call or a signaling.

3. The method of claim 1, wherein the connected mode is an Radio Resource Control ("RRC") connected mode.

4. The method of claim 1, wherein the measurement report type is related to least one of an inter-frequency handover, an intra-frequency handover, an Inter-Radio Access Technology (Inter-RAT) handover or Gap measurements.

5. The method of claim 1, wherein the prioritized measurement report type is placed in a group assigned to a first cell.

6. The method of claim 1, wherein the prioritizing is further based on a list of cells maintained by the UE.

7. The method of claim 1, further comprising:
   determining a connection sub-type of the connection type of the connected mode, wherein the prioritizing the measurement report type is further based on the connection sub-type.

8. The method of claim 1, further comprising:
   adding one of the deprioritized one or more measurement report types to the measurement group based on the priority of the one of the deprioritized one or more measurement report types with respect to the other one or more deprioritized measurement report types, a size of the one of the deprioritized one or more measurement report types and the throughput of the connection type.

9. A user equipment ("UE"), comprising:
   a transceiver configured to connect to a base station of a network; and
   a processor configured to:
   determine that the UE is in a connected mode with the base station;
   determine a connection type of the connected mode wherein the connection type is determined based on a type of traffic being exchanged between the UE and a network during the connected mode;
   prioritize a measurement report type based on the type of traffic being exchanged on the connection type, wherein prioritizing the measurement report type includes selecting one of a plurality of predetermined measurement rates that is to be applied to a performance of a measurement associated with the measurement report type, wherein the prioritized measurement report type is added to a measurement group;
   determine a size of the prioritized measurement report type and a throughput of the connection type;
   add another measurement report type to the measurement group based on the size of the prioritized measurement report type and the throughput of the connection type;
   determine when a criteria is satisfied; and
   deprioritize one or more measurement report types based on the connection type, wherein each of the one or more deprioritized measurement report types has a priority with respect to any of the other one or more deprioritized measurement report types.

10. The UE of claim 9, wherein the connection type is one of a data transfer, a voice call, an emergency call or a signaling.

11. The UE of claim 9, wherein the connected mode is an Radio Resource Control ("RRC") connected mode.

12. The UE of claim 9, wherein the measurement report type is related to least one of an inter-frequency handover, an intra-frequency handover, an Inter-Radio Access Technology (Inter-RAT) handover or Gap measurements.

13. The UE of claim 9, wherein the prioritized measurement report type is placed in a group assigned to a first cell.

14. The UE of claim 9, wherein the prioritizing is further based on a list of cells maintained by the UE, wherein the list comprises a capability of each of the cells.

15. The UE of claim 14, wherein the capability is one of VoLTE or IMS-emergency-setup.

16. The UE of claim 9, wherein the processor is further configured to:
   determine a connection sub-type of the connection type of the connected mode, wherein the prioritizing the measurement report type is further based on the connection sub-type.

17. An integrated circuit, comprising:
   circuitry to determine that a user equipment ("UE") is in a connected mode;
   circuitry to determine a connection type of the connected mode wherein the connection type is determined based on a type of traffic being exchanged between the UE and a network during the connected mode;
   circuitry to prioritize a measurement report type based on the type of traffic being exchanged on the connection type, wherein prioritizing the measurement report type includes selecting one of a plurality of predetermined measurement rates that is to be applied to a performance of a measurement associated with the measurement report type, wherein the prioritized measurement report type is added to a measurement group;
   circuitry to determine a size of the prioritized measurement report type and a throughput of the connection type;
   circuitry to add another measurement report type to the measurement group based on the size of the prioritized measurement report type and the throughput of the connection type; and
   circuitry to deprioritize one or more measurement report types based on the connection type, wherein each of the one or more deprioritized measurement report types has a priority with respect to any of the other one or more deprioritized measurement report types.

18. The integrated circuit of claim 17, wherein the connection type is one of a data transfer, a voice call, an emergency call or a signaling.

19. The integrated circuit of claim 17, wherein the measurement report type is related to least one of an inter-frequency handover, an intra-frequency handover, an Inter-Radio Access Technology (Inter-RAT) handover or Gap measurements.

* * * * *